Dec. 29, 1942.     L. N. GOULD     2,306,877
AUTOMATIC WARNING LIGHT TO INDICATE REDUCED SPEED OF MOTOR VEHICLES
Original Filed Oct. 25, 1940     2 Sheets-Sheet 1
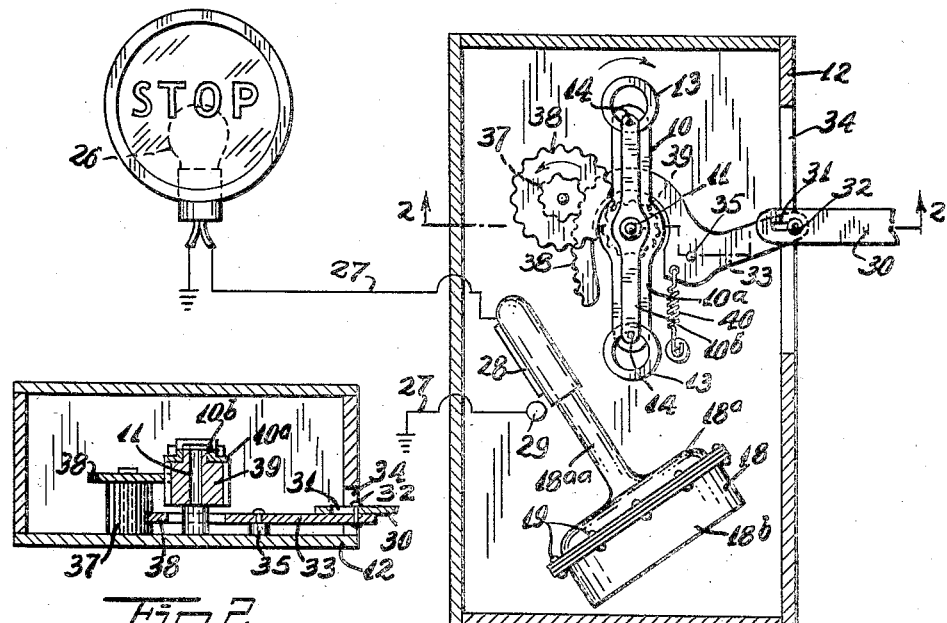
INVENTOR.
Louis N. Gould
BY
ATTORNEY Dec. 29, 1942.   L. N. GOULD   2,306,877
AUTOMATIC WARNING LIGHT TO INDICATE REDUCED SPEED OF MOTOR VEHICLES
Original Filed Oct. 25, 1940   2 Sheets-Sheet 2

INVENTOR.
Louis N. Gould
BY
ATTORNEY

UNITED STATES PATENT OFFICE 2,306,877

AUTOMATIC WARNING LIGHT TO INDICATE REDUCED SPEED OF MOTOR VEHICLES

Louis N. Gould, Boston, Mass.

Substituted for abandoned application Serial No. 362,740, October 25, 1940. This application May 23, 1942, Serial No. 444,248

6 Claims. (Cl. 200—59)

This invention relates to new and useful improvements in an automatic warning light to indicate reduced speed of a motor vehicle. The present application is a refile of an abandoned application filed by me on October 25, 1940, Serial Number 362,740.

The invention particularly proposes an automatic warning light on the rear of an automobile, or similar vehicle, to indicate to any car behind, that there is a change of speed from a higher speed to a lower speed. It is also proposed to so arrange the warning light to indicate when the car is backing up, that is, going in reverse.

More specifically the invention proposes to characterize the warning device by the fact that it includes a rotatively mounted arm for turning in either direction, a weight loosely mounted on the arm to move slightly outwards due to centrifugal force when said arm rotates, and a depressible member arranged tangentially in the path of said weight so as to be depressed when said arm rotates in one direction, and directly or indirectly control a warning signal, which preferably comprises a warning light, though this signal may just as well be acoustic.

Still further the invention contemplates the provision of a means for moving said member back to its extended position, a signal operating when said member is depressed, and means for turning said arm in one direction upon acceleration of said vehicle and turning the arm in the other direction upon retardation of the vehicle.

The automatic warning signal in accordance with this invention has numerous advantages. One of the more important being the instantaneous response of the warning signal to the slightest retardation of the vehicle; another is that if the foot is suddenly released from the accelerator pedal, the signal device will flash more rapidly and by so doing it is indicated that the car may come to a sudden slower motion or to a stop.

In one form of the invention it is proposed to characterize the means for turning the arm in one direction upon acceleration and in the other direction upon retardation, by the fact that this means is controlled by the accelerator pedal of the vehicle. With this arrangement the foot does not have to be removed from the accelerator pedal as must be done in the present brake light switch arrangement. When the accelerator pedal is allowed to move slightly upwards which indirectly reduces the speed of the vehicle, the automatic signal functions instantaneously. The driver in the rear is immediately warned of a change to a lower speed. This is particularly advantageous at night when changes of speed are not so readily discernible. The change in speed is almost immediately indicated when the car is on a straight road, or is going to make a turn, or is going in reverse.

In another form of the invention it is contemplated to characterize the means for turning the arm in one direction upon acceleration and in the other direction upon retardation by the fact that it is directly operated by the speedometer of the vehicle.

Still further the invention proposes the construction of a device as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 1 is a fragmentary transverse sectional view of an automatic warning device constructed in accordance with this invention, with certain wiring thereof schematically illustrated.

Fig. 2 is a horizontal sectional view taken on the line 2—2 of Fig. 1.

Fig. 3 is a fragmentary enlarged sectional view of a portion of the mechanism shown in Fig. 1.

Fig. 4 is a fragmentary enlarged sectional view taken on the line 4—4 of Fig. 3.

Fig. 8 is a fragmentary sectional view taken on the line 8—8 of Fig. 7.

Figure 5:
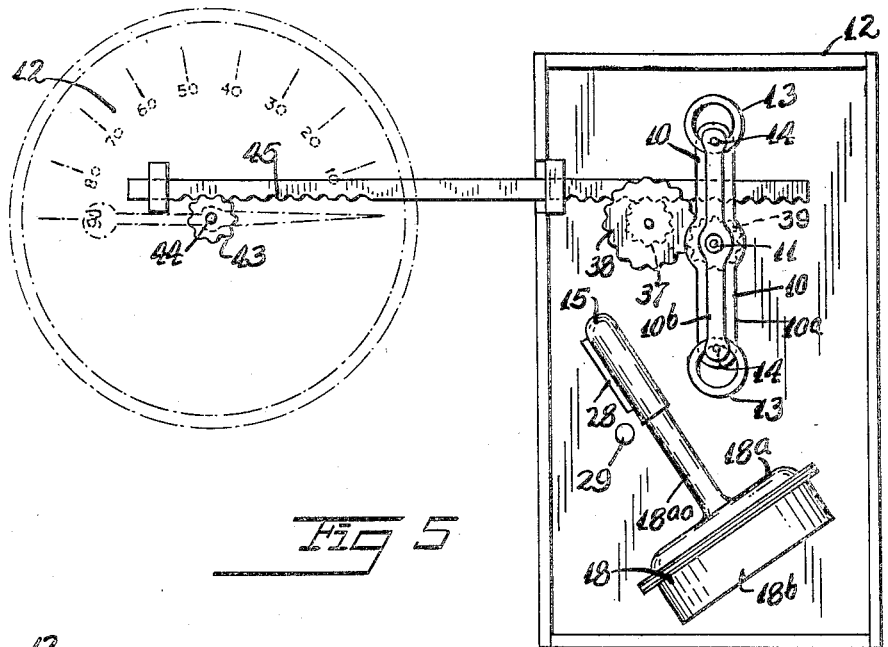
Fig. 5 is an elevational view of an automatic warning light device constructed in accordance with a modified form of this invention.

The automatic warning signal to indicate reduced speed of a motor vehicle includes a rotatively mounted arm 10 arranged to turn in either direction. The arm 10 is supported on a spindle 11 mounted on a wall of the casing 12. Weights 13 are mounted on the ends of the arm 10 to move slightly outwards when the arm rotates. More specifically, the weights 13 comprise metallic washers or similar elements. The arm 10 is formed from two sections. There is a bottom section 10ª and a top section 10ᵇ. Pins 14 are mounted between the ends of these sections. The pins 14 pass through the central openings of the washers 13. With this arrangement the washers 13 are free to slide forwards or outwards during the rotating of the arm.

A depressible member 15 is disposed tangentially of the path of the said weights 13 so as to be depressed when said arm 10 turns in one direction. The depressible member 15 is supported by a rod 16 which is mounted on a diaphragm 17 supported in a housing 18. This housing is constructed of two sections, there being a top section 18ª and a bottom section 18ᵇ. These sections are secured together with fastening elements 19. The diaphragm 17 is mounted between these sections and held in position by the fastening elements 19.

The section 18ª has a tubular projection 18ªª which extends slightly into the end of the depressible member 15 which is hollow for this purpose. Means is provided for moving the member 15 back to its extended position. This means comprises an expansion spring 20 mounted within the housing 18 and acting against the diaphragm 17 to force the diaphragm upwards and so move the rod 16 and the member 15. An arrangement is provided for slightly retarding the action of this means. This arrangement includes several passages 21 formed through the diaphragm 17 and normally closed with discs 22 which are mounted on stems 23 passing through the diaphragm. Each stem 23 has a head 24. A spring 25 is coaxially mounted on each stem 23 and acts between the head 24 and the diaphragm 17 for seating the disc 22 over the passages 21. However, this seating is not completely air-tight, the parts being so arranged that a slight leakage of air is possible.

When the member 15 is depressed, it instantly moves the rod 16 downwards, and the air entrapped in the housing section 18ᵇ will pass through the openings 21, lifting the discs 22 against the restraining actions of the springs 25. The spring 20 then functions to move the diaphragm 17 back to its extended position. However, this motion back is relatively slow since it is controlled by the leakage of air from the outside past the discs 22 and through the apertures 21 into the housing section 18ᵇ.

An arrangement is provided whereby a signal operates while the member 15 is in its depressed position. As illustrated on the drawings, this signal comprises a stop lamp 26 which is connected in a circuit 27 controlled by a pair of contacts 28 and 29. The contact 29 is stationarily mounted adjacent the member 15. The contact 28 is mounted on the member 15. Normally these contacts do not engage. However, when the member 15 is depressed, the contact 28 will engage the contact 29 for closing the circuit and operating the signal 26.

Means is provided for turning the arm 10 in one direction upon acceleration of the vehicle and turning the arm in the other direction upon retardation. This means includes a lever 30 which is for connection with the accelerator pedal of the vehicle, not illustrated on the drawings. However, the arrangement is such that when the accelerator pedal is pushed down the lever 30 will move down correspondingly. The lever 30 is provided with a slot 31 which is engaged by a pin 32 carried upon an arm 33 which extends out of a slot 34 in the casing 12. The arm 33 is pivotally mounted by the pintle 35. The arm 33 connects with a segmental gear 36 which meshes with a pinion 37 rotatively mounted on one wall of the casing 12. This pinion 37 carries a pinion 38 which meshes with a pinion 39 coaxially fixed on the spindle 11. A spring 40 is connected with the arm 33 and with a stationary point of the casing 12 and acts to normally urge the arm 33 into a starting position.

The operation of the device is as follows:

When the accelerator pedal is depressed the lever 30 moves downwards pivoting the arm 33 clockwise. The segmental gear 36 will turn in the same direction and through the medium of the pinions 37, 38, and 39 will cause the arm 10 to rotate clockwise. The weights 13 will assume extended positions upon the ends of the arm 10 during the rotation of the arm. However, they will strike the side of the depressible member 15 and glance off the member without depressing the member. When the accelerator pedal is allowed to move upwards, even slightly, the arm 33 will turn counter-clockwise. This indirectly causes the arm 10 to turn counter-clockwise. Now the weights 13 will strike the end of the depressible member 15 which is arranged tangential of the weights 13, in this direction. This hammering upon the end of the member 15 depresses the member. The extent of depression will depend upon how many times it is hit. Its extent of depression will also determine how long the member 15 remains depressed since it is immediately being urged outwards by the spring 20. However, the spring 20 is restrained by the action of the discs 22 blocking the passages 21 in the diaphragm 17. The leakage of air into the housing section 18ᵇ controls the speed with which the member moves outwards.

While the member 15 is depressed, the contacts 28 and 29 will engage each other closing the circuit 27 and operating the signal device 26. This warns operators to the rear that the vehicle is changing speed from a higher to a lower speed. Similarly, when the vehicle travels in reverse, the accelerator pedal may be depressed and then allowed to move upwards to indicate that the vehicle is being decelerated.

When the motor is running and the gears are in neutral, the accelerator pedal may be depressed and released causing the contacts 28 and 29 to engage each other and close the circuit 27. This will cause the signal 26 to flash warning motorists to the rear that a change in the position is about to take place.

In Fig. 5 a modified form of the invention has been disclosed which distinguishes from the prior form in the means for turning the arm in one direction upon acceleration of the vehicle and turning the arm in the other direction upon retardation of the vehicle. In this form of the invention this means is controlled by the conventional speedometer 42 of the vehicle. A pinion 43 is mounted upon the spindle 44 of the speedometer. This pinion 43 meshes with a rack 45, which meshes with the pinion 37 of the automatic warning device.

When the speedometer needle functions indicating increases of speed, the arm 10 rotates in a direction in which the weights 13 are ineffective in depressing the member 15. However, when the speedometer needle falls, indicating the retardation of the vehicle, the arm 10 will operate in the opposite direction, depressing the member 15 and setting the signal 26 or other corresponding signal into operation.

In other respects this form of the invention is identical to the prior form and identical parts may be recognized by identical reference numerals.

Figures 6, 7:
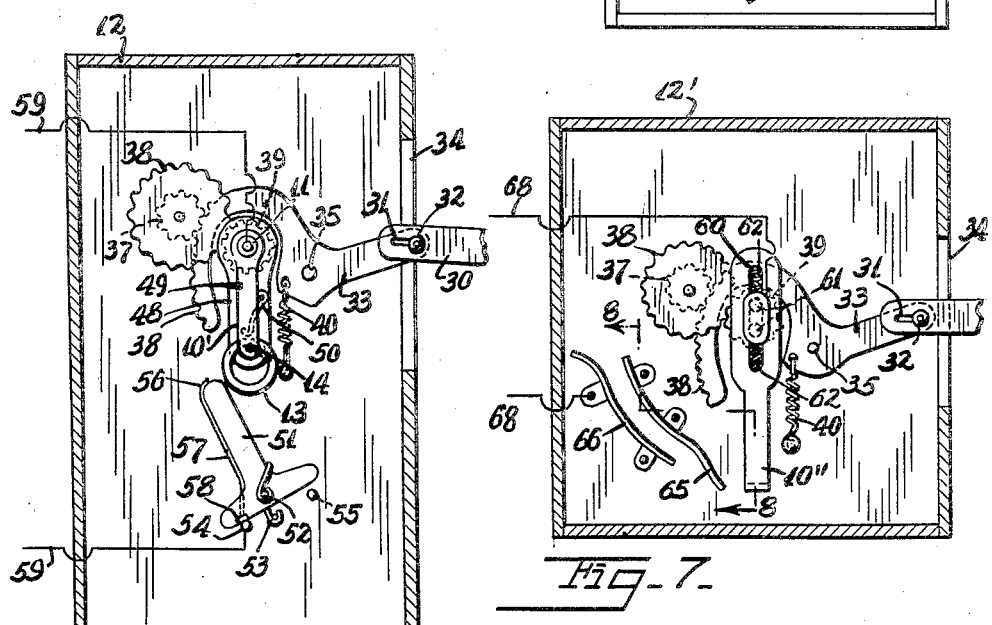
Fig. 6 is a fragmentary transverse sectional view of an automatic warning device similar to that illustrated in Fig. 1 but showing another modified form of the invention.
Fig. 7 is another similar sectional view illustrating still another modification.

In the modified form of the invention illustrated in Fig. 6 an automatic warning signal has been shown to indicate the reduced speed of a motor vehicle, which includes a rotatively mounted arm 10' arranged to turn in either direction. The arm 10' is supported on a spindle 11 mounted on a wall of the casing 12. A weight 13 is mounted on the outer end of the arm 10' to move slightly outwards when the arm rotates. The weight 13 comprises a metallic washer or similar element. The arm 10' is formed from two sections comprising a bottom section 48 and a top section 49. A pin 14 is mounted between the ends of these sections. The pin 14 passes through the central opening of the washer 13. A leaf spring 50 is mounted on the arm section 48 and acts against the washer 13 to resiliently urge it outwards. With this arrangement the washer 13 is free to resiliently slide inwards and outwards during the rotation of the arm 10'.

A member 51 is disposed tangential of the path of said weight 13 so as to be engaged on one end by said weight when the arm 10' turns in one direction. The member 51 is substantially of inverted T-shape. It is pivotally supported by a pin 52 mounted on the casing 12. A spring 53 is coaxially arranged on the pintle 52 and acts between the casing 12 and the member 51 to resiliently urge it counter-clockwise against a stationary pin 54. The member 51 may turn slightly clockwise until arrested by a stationary pin 55. These pins 54 and 55 are mounted on the casing 12.

Signal means is provided for operating a suitable signal when the weight 13 engages the end of the member 51. This signal operating means includes a contact 56 mounted upon one side and partially on the end of the member 51 and connected with a lead 57 in turn connected with a stationary contact 58 engaging the pin 42 in the normal position of the member 51. When the arm 10' rotates clockwise the washer 13 strikes against the side of the member 51 without touching the contact 56. However, when the arm 10' rotates counterclockwise the washer 13 will strike the contact 56. The member 51 is of insulation material. The pin 54 is connected in a circuit 59 which includes the arm 10' as schematically shown in Fig. 6.

Means is provided for turning the arm 10' in one direction upon acceleration of the vehicle, and turning the arm in the other direction upon retardation. This means is identical to similar means shown in the first form of this invention and identical parts are identified by like reference numerals.

In Figs. 7 and 8 a modified form of the invention has been disclosed which distinguishes from the prior form in the construction of the rotative arm, and in the signal operating means.

According to this form of the invention there is a rotative arm 10'' which is formed with a slot 60 engaged by a pair of slightly spaced pins 61 mounted on the side of the pinion 39. Springs 62 are disposed within the slot 60 and act against the pins 61 for resiliently holding the arm 10' in a neutral position so that it may slide a short distance on the pins 61. The outer end of the arm 10' is provided with an inturned portion 64 coactable with a shield 65 and a track contact 66. When the arm 10'' turns counter-clockwise the offset end 64 will periodically ride the track contact 66. However, when the arm 10'' turns clockwise the offset end 64 will ride the shield 65 which will prevent it from coming into contact with the track element 66. The springs 62 permit the arm 10'' to move slightly inwards or outwards depending upon whether it is riding the shield 65 or the track contact 66.

Means is provided for turning the arm 10'' in one direction upon acceleration of the vehicle and turning the arm in the other direction upon retardation. This means is identical to the corresponding means disclosed in the other forms of the invention and identical parts are identified by like reference numerals. The device is provided with a casing 12' which is slightly smaller than the casing 12. A signal operating circuit 68 is provided which includes the contact tract 66 and the arm 10'' as schematically shown in Fig. 7.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A device of the class described comprising a rotatively mounted arm for turning in either direction, a weight loosely mounted on said arm to move slightly outwards when said arm rotates, a depressible member disposed tangential of the path of said weight so as to be depressed when said arm turns in one direction for closing the switch of an electrical circuit, means for moving said member back to its extended position, and means for turning said arm in one direction upon acceleration of said vehicle and turning the arm in the other direction upon retardation of said vehicle.

2. A device of the class described comprising a rotatively mounted arm for turning in either direction, a weight loosely mounted on said arm to move slightly outwards when said arm rotates, a depressible member disposed tangential of the path of said weight so as to be depressed when said arm turns in one direction for closing the switch of an electrical circuit, means for moving said member back to its extended position, and means for turning said arm in one direction upon acceleration of said vehicle and turning the arm in the other direction upon retardation of said vehicle, said switch including a pair of contacts, one of which is mounted on said depressible member and engageable with an adjacent stationary contact.

3. A device of the class described comprising a rotatively mounted arm for turning in either direction, a weight loosely mounted on said arm to move slightly outwards when said arm rotates, a depressible member disposed tangential of the path of said weight so as to be depressed when said arm turns in one direction for closing the switch of an electrical circuit, means for moving said member back to its extended position, means for turning said arm in one direction upon acceleration of said vehicle and turning the arm in the other direction upon retardation of said vehicle, said arm being rotatively supported at its center and having a weight mounted upon each of its ends to strike said depressible member twice for each complete revolution of said arm.

4. A device of the class described comprising a rotatively mounted arm for turning in either direction, a weight loosely mounted on said arm to move slightly outwards when said arm rotates, a depressible member disposed tangential of the path of said weight so as to be depressed when said arm turns in one direction for closing the switch of an electrical circuit, means for moving said member back to its extended position, means for turning said arm in one direction upon acceleration of said vehicle and turning the arm in the other direction upon retardation of said vehicle, said latter means being controlled by the accelerator pedal of said vehicle.

5. A device of the class described comprising a rotatively mounted arm for turning in either direction, a weight loosely mounted on said arm to move slightly outwards when said arm rotates, a depressible member disposed tangential, of the path of said weight so as to be depressed when said arm turns in one direction for closing the switch of an electrical circuit, means for moving said member back to its extended position, and means for turning said arm in one direction upon acceleration of said vehicle and turning the arm in the other direction upon retardation of said vehicle, comprising a system of pinions connected with said arm, a segmental gear meshing with one pinion of said system, a spring urging said segmental gear in one direction, and a lever adapted to move the segmental gear in the other direction when moved.

6. A device of the class described comprising a rotatively mounted arm for turning in either direction, a weight loosely mounted on said arm to move slightly outwards when said arm rotates, a depressible member disposed tangential of the path of said weight so as to be depressed when said arm turns in one direction for closing the switch of an electrical circuit, means for moving said member back to its extended position, and means for turning said arm in one direction upon acceleration of said vehicle and turning the arm in the other direction upon retardation of said vehicle, comprising a system of pinions connected with said arm, a segmental gear meshing with one pinion of said system, a spring urging said segmental gear in one direction, and a lever adapted to move the segmental gear in the other direction when moved, said lever being adapted to be connected with the accelerator of said motor vehicle.

LOUIS N. GOULD.